United States Patent
Pathangay et al.

(10) Patent No.: US 9,482,538 B1
(45) Date of Patent: Nov. 1, 2016

(54) METHOD AND SYSTEM FOR OPTIMALLY LOCALIZING VEHICLES IN A PARKING ENVIRONMENT

(71) Applicant: Wipro Limited, Bangalore (IN)

(72) Inventors: Vinod Pathangay, Bangalore (IN); Rahul Siripurapu, Karnataka (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/857,048

(22) Filed: Sep. 17, 2015

(30) Foreign Application Priority Data

Jul. 28, 2015 (IN) .......................... 3866/CHE/2015

(51) Int. Cl.
 *G01C 21/26* (2006.01)
 *G01P 15/18* (2013.01)
 *G01C 21/34* (2006.01)

(52) U.S. Cl.
 CPC ............... *G01C 21/26* (2013.01); *G01C 21/34* (2013.01); *G01P 15/18* (2013.01)

(58) Field of Classification Search
 CPC ....... G01C 21/26; G01C 21/34; G01P 15/18; G08G 1/14
 USPC .................................. 701/522, 472; 340/436
 See application file for complete search history.

(56) References Cited

U.S. PATENT DOCUMENTS

| | | | |
|---|---|---|---|
| 6,005,610 A | 12/1999 | Pingali | |
| 6,426,708 B1 | 7/2002 | Trajkovic et al. | |
| 7,162,338 B2 | 1/2007 | Goncalves et al. | |
| 7,480,395 B2 | 1/2009 | Parunak et al. | |
| 7,536,029 B2 | 5/2009 | Choi et al. | |
| 7,893,848 B2 | 2/2011 | Chew | |
| 8,416,120 B2 | 4/2013 | Kim et al. | |
| 8,624,756 B2 | 1/2014 | Ganot | |
| 8,761,809 B2 | 6/2014 | Faith et al. | |
| 8,938,366 B2 | 1/2015 | Nielsen et al. | |
| 2005/0114079 A1 | 5/2005 | Rui et al. | |
| 2008/0294342 A1* | 11/2008 | Hoshizaki ............ G01C 21/165 701/472 |

(Continued)

FOREIGN PATENT DOCUMENTS

WO WO 01/25048 A1 4/2001
WO WO 2011/099842 A2 8/2011

(Continued)

OTHER PUBLICATIONS

T. Teixeira et al., "Tasking Networked CCTV Cameras and Mobile Phines to Identify and Localize Multiple People", Ubicomp '10, 10 pages (2010).

*Primary Examiner* — Tan Q Nguyen
(74) *Attorney, Agent, or Firm* — Finnegan, Henderson, Farabow, Garrett & Dunner, L.L.P.

(57) ABSTRACT

The present disclosure relates to a method and system for optimally localizing vehicles in a parking environment. The method comprises receiving, by a vehicle localization server, 3D acceleration data of each of one or more vehicles when each of the one or more vehicles passes through one or more bumps in the parking environment. Upon receiving the 3D acceleration data, the vehicle localization server compares the 3D acceleration data with one or more predefined 3D acceleration data to identify the location status of each of the one or more bumps. The location status of the bumps corresponds to location status of the vehicle. The vehicle localization server localizes each of the one or more vehicles in the parking environment based on the location status of each of the one or more vehicles.

17 Claims, 5 Drawing Sheets

(56) References Cited

U.S. PATENT DOCUMENTS

| | | | |
|---|---|---|---|
| 2010/0103036 A1* | 4/2010 | Malone | B60R 25/24 342/357.34 |
| 2010/0150404 A1 | 6/2010 | Marks et al. | |
| 2010/0211307 A1 | 8/2010 | Geelen | |
| 2014/0232570 A1 | 8/2014 | Skinder et al. | |
| 2014/0335893 A1 | 11/2014 | Ronen | |
| 2015/0246654 A1* | 9/2015 | Tadic | B60W 40/09 340/436 |

FOREIGN PATENT DOCUMENTS

| | | |
|---|---|---|
| WO | WO 2012/024516 A2 | 2/2012 |
| WO | WO 2014/105846 A2 | 7/2014 |

* cited by examiner

METHOD AND SYSTEM FOR OPTIMALLY LOCALIZING VEHICLES IN A PARKING ENVIRONMENT

TECHNICAL FIELD

The present subject matter is related, in general to vehicle navigation, and more particularly, but not exclusively to a method and system for optimally localizing vehicles in a parking environment.

BACKGROUND

Rising affordability is leading to tremendous consumption of industrial goods in the society. One such good is a car, which is now possessed by millions of people. Now, urban places have got very limited space for example a business establishment, a school, a multiplex, a business avenue, etc. for parking of the vehicles. All these possess a limited space that could accommodate only a certain number of vehicles. Hence, parking space needs to be efficiently managed in order to accommodate the vehicles and also regulate their movement in the parking space.

At present, there exist a lot of approaches and solutions to manage parking space efficiently. The parking space management solutions begin with localization of the vehicle when the vehicles are entering the parking zone. In most of these solutions, Global Positioning System (GPS) along with video camera feed is the usual technique used to localize the vehicles. However, as most of the parking spaces are in poor network coverage areas, like basement, underground, etc. the GPS signal is commonly unreliable and in many cases dysfunctional. Hence, existing approaches do not provide accurate or efficient localization solutions. Some advancement to address this issue involves expensive equipments which are based on radio beacons and requires additional sensors to be installed which add to the infrastructure cost.

The issues mainly faced in localization of vehicles are to accurately determine when the vehicles are entering the parking environment and to localize the vehicles efficiently in the parking environment where the GPS signals are very weak.

SUMMARY

Disclosed herein is a method and system for optimally localizing vehicles in a parking environment. The parking environment is provided with one or more bumps. When the vehicles pass over the bumps, 3D acceleration data is captured by an accelerometer associated with a mobile device in a vehicle and based on the 3D accelerometer data, the location data of the vehicle is identified. Based on the location data, the vehicles are localized in the parking environment.

Accordingly, the present disclosure relates to a method for optimally localizing vehicles in a parking environment. The method comprises receiving, by a vehicle localization server, 3D acceleration data of each of one or more vehicles when each of the one or more vehicles passes through one or more bumps in the parking environment. Upon receiving the 3D acceleration data, the vehicle localization server compares the 3D acceleration data with one or more predefined 3D acceleration data, wherein each of the one or more predefined 3D acceleration data is associated with location status of each of the one or more bumps. The method further comprises obtaining, by the vehicle localization server, the location status of each of the one or more vehicles corresponding to the matched predefined acceleration data. Finally, the vehicle localization server localizes each of the one or more vehicles in the parking environment based on the location status of each of the one or more vehicles.

Further, the present disclosure relates to a vehicle localization server for optimally localizing vehicles in a parking environment. The vehicle localization server comprises a processor and a memory communicatively coupled to the processor, wherein the memory stores processor-executable instructions, which, on execution, causes the processor to receive 3D acceleration data of each of one or more vehicles when each of the one or more vehicles passes through one or more bumps in the parking environment. The processor executable instructions further causes the processor to compare the acceleration data with one or more predefined acceleration data, wherein each of the one or more predefined acceleration data is associated with location status of each of the one or more bumps. The processor executable instructions further causes the processor to obtain the location status of each of the one or more vehicles corresponding to the matched predefined acceleration data. Finally, the processor executable instructions cause the processor to localize each of the one or more vehicles in the parking environment based on the location status of each of the one or more vehicles.

Furthermore, the present disclosure relates to a non-transitory computer readable medium including instructions stored thereon that when processed by at least one processor cause a vehicle localization server to perform the acts of receiving 3D acceleration data of each of one or more vehicles when each of the one or more vehicles passes through one or more bumps in the parking environment. The vehicle localization server compares the 3D acceleration data with one or more predefined 3D acceleration data, wherein each of the one or more predefined acceleration data is associated with location status of each of the one or more bumps. Further, the vehicle localization server obtains the location status of each of the one or more vehicles corresponding to the matched predefined acceleration data and localizes each of the one or more vehicles in the parking environment based on the location status of each of the one or more vehicles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
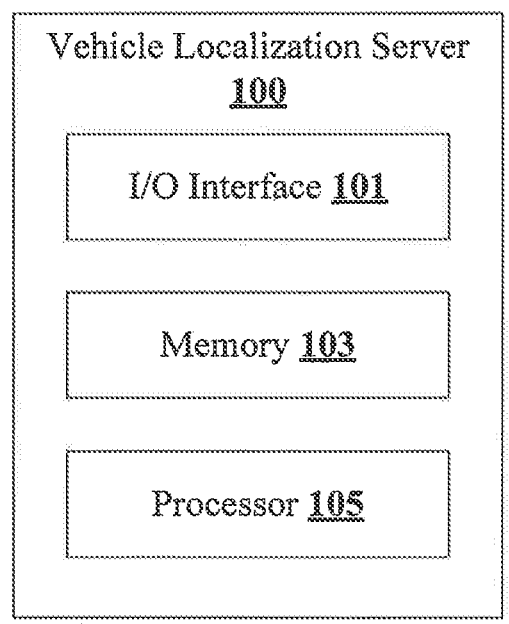
FIG. 1a shows a block diagram illustrating a vehicle localization server in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for localizing vehicles in a parking environment. The parking environment is configured with one or more bumps also referred as speed bumps. The shape and height of each of the one or more bumps are adjustable by a vehicle localization server. Each of the vehicles passing over the one or more bumps is provided with a mobile device which is associated with an accelerometer. When the vehicles pass over the bumps in the parking environment, the accelerometer captures 3D acceleration data of the vehicle and transmits the data to the vehicle localization server. The 3D acceleration data provides information of shape, type and location status of the bump in the parking environment. The data associated with each bump namely bump signature is stored in the vehicle location server. The data includes, bump shape, height and the location of the bump in the parking environment. When the vehicle passes over the bump, the 3D acceleration data is captured and provided to the vehicle localization server. Based on the location status of the bump, the location status of the vehicle is identified. The vehicle location server compares the received 3D acceleration data with one or more predefined 3D acceleration data to find a match for the received 3D acceleration data. Each of the one or more 3D acceleration data is associated with location status of the bump. The location status corresponding to the matched predefined 3D acceleration data is obtained. Based on the location status the vehicle is localized in the parking environment.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows a block diagram illustrating a vehicle localization server in accordance with some embodiments of the present disclosure.

The vehicle localization server 100 comprises an I/O interface 101, a memory 103 and a processor 105. The I/O interface 101 is configured to receive data from one or more vehicles. In an embodiment, the data is 3D acceleration data associated with the vehicle. Each of the one or more vehicles is associated with a mobile device. As an example, the mobile device may include but not limited to a mobile phone. The mobile device comprises an accelerometer to detect motion and vibration of the vehicle. The parking environment is provided with one or more bumps. The shape and height of each of the one or more bumps are adjustable by the vehicle localization server 100. When each of the one or more vehicles passes over the one or more bumps, the accelerometer detects the motion and vibration of the vehicle and transmits the 3D acceleration data of each vehicle to the vehicle localization server 100.

The received 3D acceleration data is stored in the memory 103. The memory 103 is communicatively coupled to the processor 105. The memory 103 stores one or more predetermined 3D acceleration data. In an embodiment, the predetermined 3D acceleration data is associated with location status of the one or more bumps. The memory also stores information of shape and height of each of the one or more bumps in the parking environment and location of each of the one or more bumps in the parking environment. When the vehicle passes over the bump, the accelerometer provided in the mobile device of the vehicle detects the 3D accelerometer data and transmits the data to the vehicle localization server 100. The vehicle localization server 100 compares the received 3D acceleration data with one or more predefined 3D acceleration data. The location status corresponding to the matched 3D acceleration data is obtained. The matched location status corresponds to the location status of the bump. Based on the location status of the bump, the location status of the vehicle is identified. Upon identifying the location status of the vehicle, the processor 105 localizes the vehicle in the parking environment. Further, the processor 105 detects the parking slot in the parking environment based on the location status of the vehicle and type of the vehicle. The type of the vehicle is also identified based on the 3D acceleration data. As an example, vehicles with larger tyres may have larger radius of movement which is detected by the accelerometer. The longer vehicles may have longer gap between the front and back wheels passing the bump and weight and type of suspension of each vehicle is identified based on the oscillations after passing over the bump.

Upon detecting the suitable parking slot, the processor 105 provides direction to the vehicle towards the suitable parking slot. If the vehicle is not parked in the suitable parking slot, then the vehicle localization server 100 detects the next available parking slot in the parking environment and provides the directions towards the next available parking slot and the process continues until the vehicle is parked in the parking environment.

Figure 1B:
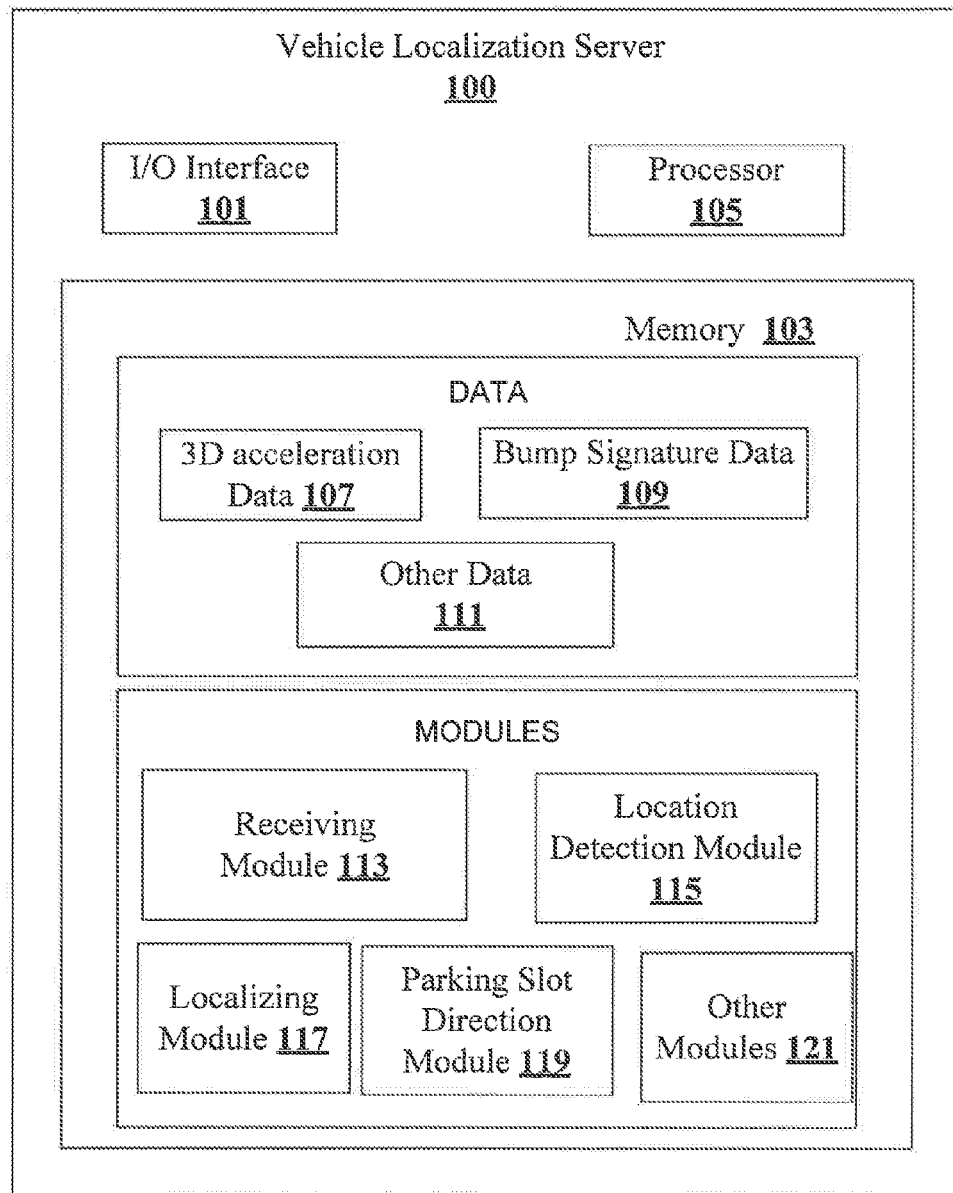
FIG. 1b shows a detailed block diagram illustrating a vehicle localization server in accordance with some embodiments of the present disclosure.

FIG. 1b shows a detailed block diagram illustrating a vehicle localization server in accordance with some embodiments of the present disclosure.

In one implementation, the vehicle localization server 100 receives data from the vehicles. As an example, the data is stored within the memory 103. In an embodiment, the data includes 3D acceleration data 107. The vehicle localization server 100 also includes bump signature data 109 and other data 111. In the illustrated FIG. 1b, one or more modules stored in the memory 103 are described herein in detail.

In one embodiment, the data may be stored in the memory 103 in the form of various data structures. Additionally, the aforementioned data can be organized using data models, such as relational or hierarchical data models. The other data 111 may store data, including temporary data and temporary files, generated by modules for performing the various functions of the vehicle localization server 100.

In an embodiment, the 3D acceleration data 107 is received from the vehicles. Each vehicle is associated with a mobile device. The mobile device is configured with the accelerometer. The accelerometer detects the motion of the vehicle and the vibration of the vehicle when the vehicle passes over the bumps. Each bump has a different shape and height. When the vehicle passes over the bumps, the 3D acceleration data 107 is detected and transmitted to the vehicle localization server 100. Based on the 3D acceleration data 107, the type of the vehicle is detected and also the location of the vehicle is detected.

In an embodiment, the bump signature data 109 is associated with each bump provided in the parking environment. Each bump is of different shape and height such that the signatures of each are different which helps in identifying the location of each bump in the parking environment. The bump signature of each bump is stored in the vehicle localization server 100. When each vehicle passes over the bump, the corresponding signature of the bump is transmitted to the vehicle localization server 100.

In an embodiment, the data stored in the memory 103 are processed by the modules of the vehicle localization server 100. The modules may be stored within the memory 103 as shown in FIG. 1b. In an example, the modules, communicatively coupled to the processor 105, may also be present outside the memory 103.

In one implementation, the modules may include, for example, a receiving module 113, location detection module 115, localizing module 117, parking slot direction module 119 and other modules 121. The other modules 121 may be used to perform various miscellaneous functionalities of the vehicle localization server 100. It will be appreciated that such aforementioned modules may be represented as a single module or a combination of different modules.

In an embodiment, the receiving module 113 is configured to receive 3D acceleration data 107 from each of the one or more vehicles. As an example, one or more vehicles may pass over the one or more bumps in the parking environment. When the vehicle pass over the bumps, the accelerometer provided in the mobile device of each vehicle detects the motion of the vehicle over the bump and transmits the 3D acceleration data 107 associated with the vehicle to the vehicle localization server 100. The 3D acceleration data 107 of each vehicle when the vehicle passes over each bump is transmitted to the vehicle localization server 100. The 3D acceleration data 107 includes but not limited to type of the vehicle, movement of the vehicle and the suspension of the vehicle.

In an embodiment, the location detection module 115 compares the received 3D acceleration data 107 with one or more predefined 3D acceleration data. Each of the one or more predefined 3D acceleration data is associated with location status of the bump. The location detection module 115 obtains the location status corresponding to the matched predefined 3D acceleration data. The location status of the bump corresponds to the location status of the vehicle in the parking environment. Based on the location status, the vehicle localization server 100 identifies the location of the vehicle in the parking environment and identifies that the vehicle has entered the parking environment.

In an embodiment, the localizing module 117 is configured to localize the vehicles in the parking environment based on the location status of the vehicles. Further, the localizing module 117 detects the suitable parking slot in the parking environment for parking the vehicle. The suitable parking slot and the availability of the parking slot is detected based on the location of the vehicle and the type of the vehicle. As an example, there are three bumps in the parking environment. The location status of the vehicle is near the first bump. Therefore, the suitable parking slot for the vehicle is near the first bump in the parking environment.

In an embodiment, the parking slot direction module 119 provides direction indication to the mobile device associated with the vehicle for guiding the vehicle towards the detected suitable parking slot. As an example, a fixed map is used for guiding the vehicles towards the detected suitable parking slot.

Figure 2:
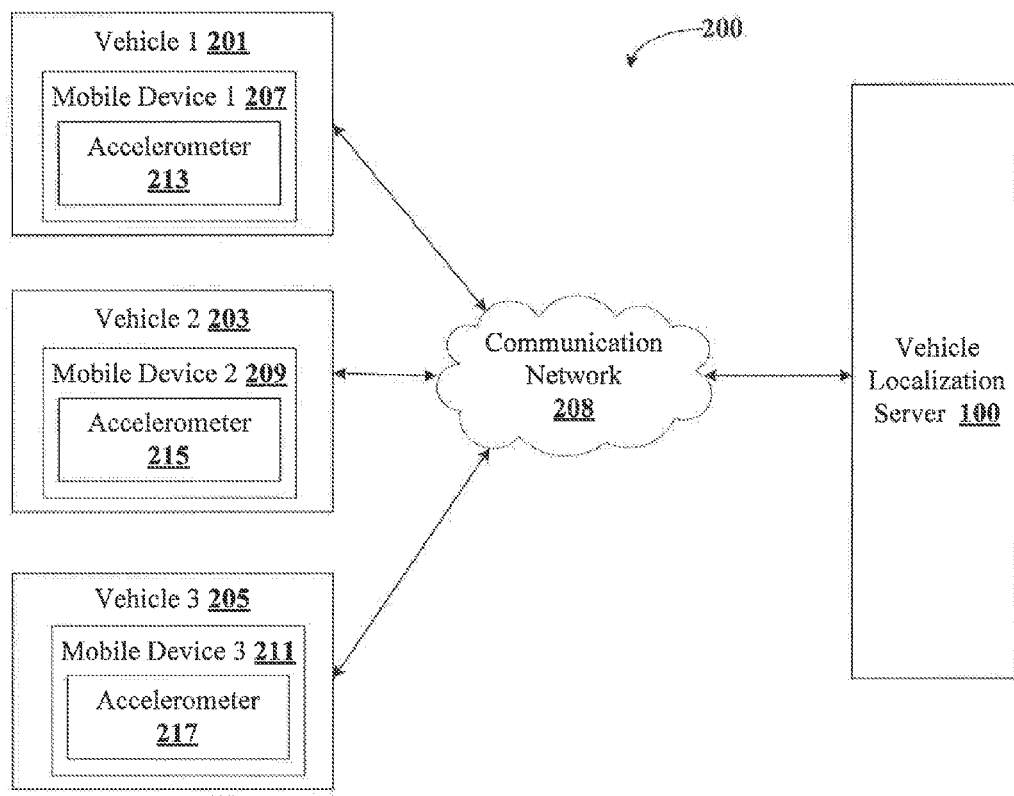
FIG. 2 shows an exemplary environment illustrating a method for localizing vehicles in a parking environment in accordance with some embodiments of the present disclosure.

FIG. 2 shows an exemplary environment illustrating a method for optimally localizing vehicles in a parking environment in accordance with some embodiments of the present disclosure.

As shown in FIG. 2, the environment 200 comprises of three vehicles namely, vehicle 1 201, vehicle 2 203 and vehicle 3 205. Each vehicle is associated with a mobile device. The vehicle 1 201 is associated with mobile device 1 207, the vehicle 2 203 is associated with the mobile device 2 209 and the vehicle 3 205 is associated with the mobile device 3 211. Each mobile device is associated with the accelerometer. The mobile device 1 207 is configured with accelerometer 213, the mobile device 2 203 is configured with accelerometer 215 and the mobile device 3 211 is configured with accelerometer 217. The accelerometer is configured to detect the motion of the vehicle and the vibration of the vehicle as well. As an example, the three vehicles have entered the parking environment. The parking environment comprises of one or more bumps. The shape and size of each bump is adjustable by the vehicle localization server 100. Each bump is associated with a bump signature. The bump signature comprises information of the shape, height and the location of the bump. The information of the distance between the bumps is also determined and the information is stored in the vehicle localization server 100. As an example, the vehicle 1 201 passes over the first bump in the parking environment. The accelerometer 213 detects the suspension of the vehicle 1 201 over the first bump and transmits 3D acceleration data associated with the first bump through a communication network 208 to the vehicle localization server 100. As an example, the communication network 208 may include but not limited to a wired communication network, wireless communication network or combination thereof. Similarly, the 3D acceleration data of each vehicle when each vehicle passes over the one or more bumps is provided to the vehicle localization server 100. The vehicle localization server 100 stores one or more predefined 3D acceleration data corresponding to each bump in the parking environment. The vehicle localization server 100 compares the 3D acceleration data with one or more predefined 3D acceleration data and identifies the predefined 3D acceleration data which matches with the received 3D acceleration data. The matched predefined 3D acceleration data is associated with the location status of the bump i.e the location of the bump is identified based on the matched predefined 3D acceleration data. The location of the bump indicates the location of the vehicle in the parking environment. Similarly, the location of all the vehicles is identified in the parking environment. Once the location is identified, based on the location, the vehicles are localized in the parking environment. The vehicle localization server 100 determines the suitable parking slot for each vehicle in the parking environment. Based on shape and size of the vehicle and the location of the vehicle, the suitable parking slot is detected. Upon detecting the suitable parking slot, the vehicle localization server 100 provides a fixed map to the mobile device. The mobile device displays the fixed map for guiding the vehicle towards the detected suitable parking slot. If the vehicle is not parked in the detected parking slot then the next suitable parking slot is detected by the vehicle by continuously monitoring the vehicle and when the vehicle passes through the next bump in the parking environment. Then based on the bump signature, the location of the vehicle is detected again and the nearby parking slot is detected. The process of detecting the paring slot and guiding the vehicle towards the detects parking slot continues until the vehicle is parked in the parking environment.

Figure 3:
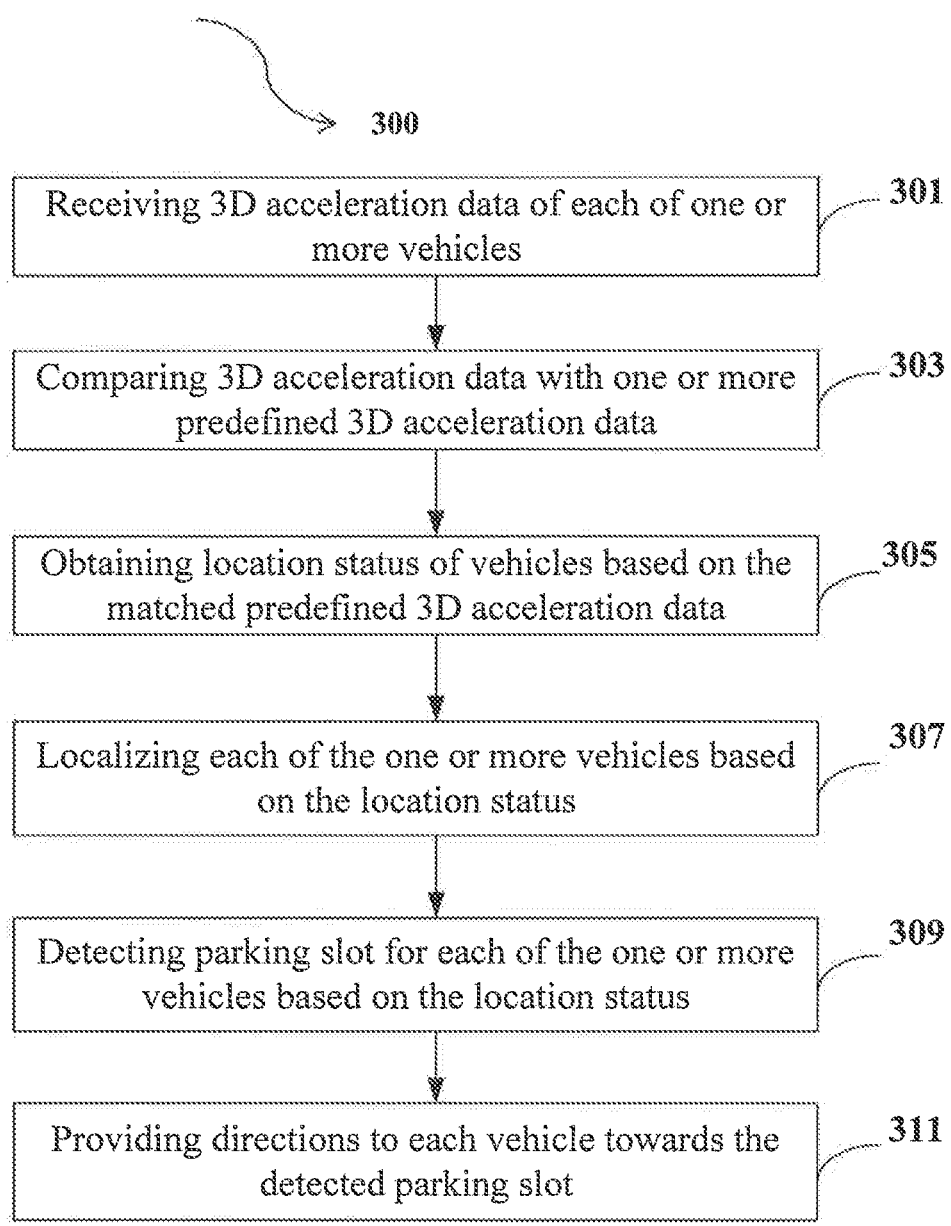
FIG. 3 illustrates a flowchart showing a method for localizing vehicles in a parking environment in accordance with some exemplary embodiments of the present disclosure.

FIG. 3 illustrates a flowchart showing method for optimally localizing vehicles in a parking environment in accordance with some embodiments of the present disclosure.

As illustrated in FIG. 3, the method 300 comprises one or more blocks for optimally localizing vehicles in a parking environment using a vehicle localization server 100. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, 3D acceleration data 107 of one or more vehicle are received by a vehicle localization server 100. When each vehicle passes over the one or more bumps, the accelerometer configured in the mobile device associated with the vehicle detects the movement and the vibration of the vehicle and transmits the 3D acceleration data 107 to the vehicle localization server 100.

At block 303, the 3D acceleration data 107 is compared with one or more predefined 3D acceleration data. Each bump is associated with bump signature. The bump signatures are stored in the vehicle localization server 100. The bump signatures correspond to the shape size and location information. The 3D acceleration data provides information of the shape, size and the location of the bump.

At block 305, the vehicle localization server 100 obtains the location status of the vehicle. The predefined 3D acceleration data which matches with the received 3D acceleration data are detected and the corresponding the location status are obtained. The corresponding location status indicates the location status of the bump. The location status of the bump corresponds to the location status of the vehicle.

At block 307, the vehicles are localized in the parking environment. The location status indicates the location of the vehicle in the parking environment. Based on the location status each of the one or more vehicles is localized in the parking environment towards the suitable parking slot.

At block 309, the suitable parking slot is detected. The vehicle localization server 100 detects the suitable parking slot for each vehicle based on the location of the vehicle and the type of the vehicle. The type of vehicle includes but not limited to shape of the vehicle and the height of the vehicle.

At block 311, the directions are indicated towards the detected parking slot. The vehicle localization server 100 provides a fixed map to each mobile device in the vehicle. The fixed map provides directions to the vehicle towards the detected suitable parking slot. Based on the directions the user may park the vehicle. in case the user does not park in the suitable parking slot and moves ahead in the parking environment, then the vehicle localization server 100 detects the next bump the vehicle passes over and based on the bump location identifies the vehicles locations and detects the next suitable paring slot. The process of detecting the suitable parking slot and providing directions for parking continues until the vehicle is parked in the parking environment.

Computer System

Figure 4:
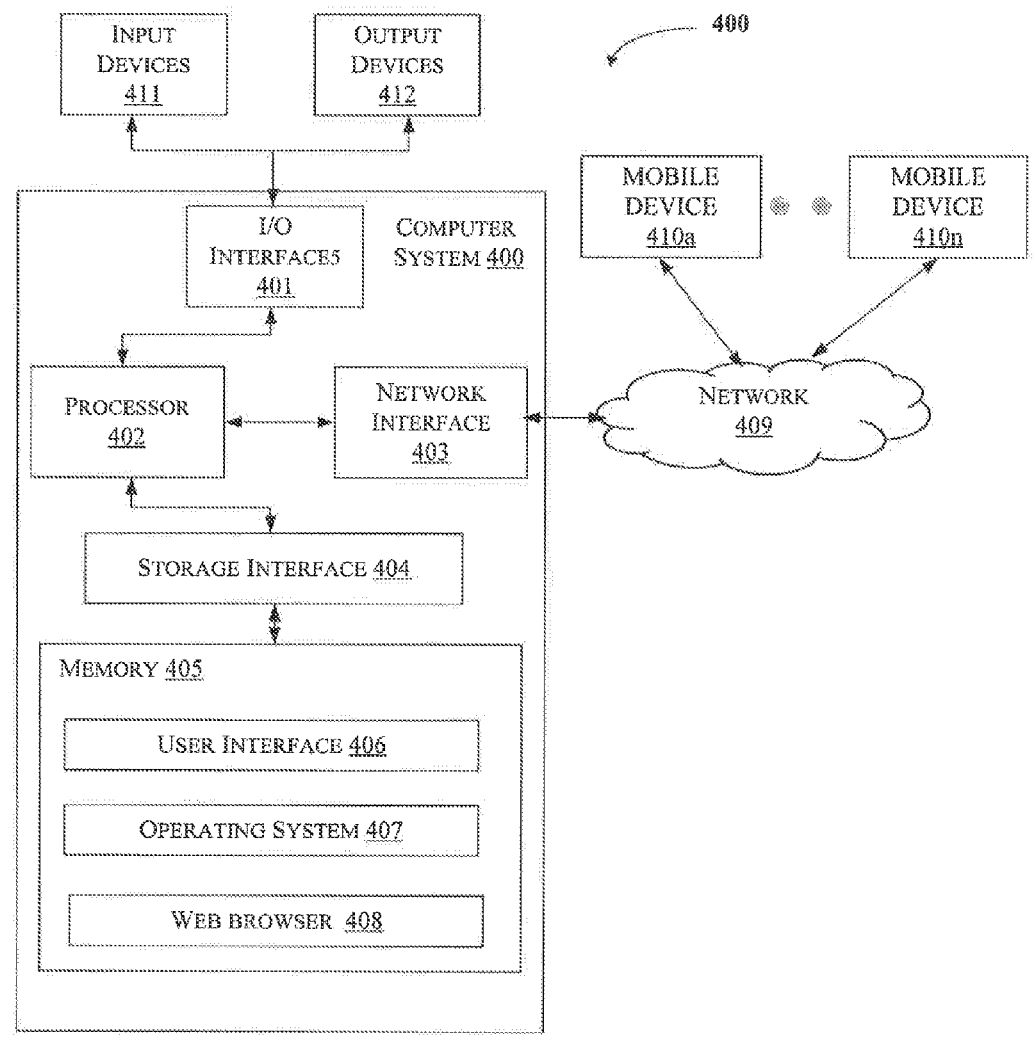
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used to optimally localize the vehicles in the parking environment using vehicle localizing server 100. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), highdefinition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method and system to localize the vehicles in a parking environment without relying completely on GPS or other specific localization services.

In an embodiment, the present disclosure provides a method for determining when a particular vehicle is passing through a particular point in the entry/exit or any other intermediate points in the parking environment.

The present disclosure provides a cost-effective solution for the localization of the vehicles efficiently since the invention utilizes the exist devices like mobile device already present inside the vehicle along with the user for providing the directions to the user for parking.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Vehicle Localization Server |
| 101 | I/O Interface |
| 103 | Memory |
| 105 | Processor |
| 107 | 3D acceleration data |
| 109 | Bump signature data |
| 111 | Other data |
| 113 | Receiving Module |
| 115 | Location detection Module |
| 117 | Localizing Module |
| 119 | Parking slot direction module |
| 121 | Other Modules |
| 201-203 | Vehicle 1-Vehicle 3 |
| 207-211 | Mobile device 1-Mobile device 3 |

The invention claimed is:

1. A method for optimally localizing vehicles in a parking environment, the method comprising:
receiving, by a vehicle localization server, 3D acceleration data of each of one or more vehicles when each of the one or more vehicles passes through one or more bumps in the parking environment;
comparing, by the vehicle localization server, the 3D acceleration data with one or more predefined 3D acceleration data, wherein each of the one or more predefined 3D acceleration data is associated with location status of each of the one or more bumps;
obtaining, by the vehicle localization server, the location status of each of the one or more vehicles corresponding to the matched predefined 3D acceleration data; and
localizing, by the vehicle localization server, each of the one or more vehicles in the parking environment based on the location status of each of the one or more vehicles.

2. The method as claimed in claim 1, wherein shape and height of each of the one or more bumps is adjustable by the vehicle localization server.

3. The method as claimed in claim 1, wherein the 3D acceleration data is received from a mobile device associated with each of the one or more vehicles.

4. The method as claimed in claim 1 further comprising identifying type of each of the one or more vehicles based on the 3D acceleration data of each of the one or more vehicles.

5. The method as claimed in claim 4 further comprising:
detecting, by the vehicle localization server, a suitable parking slot in the parking environment for each of the one or more vehicles based on the location status and the type of each of the one or more vehicles; and
providing, by the vehicle localization server, directions to each of the one or more vehicles towards the detected parking slot.

6. The method as claimed in claim 5 further comprising:
detecting, by the vehicle localization server, a next parking slot in the parking environment for the one or more vehicles if the one or more vehicles are not parked in the detected parking slot; and
providing, by the vehicle localization server, directions to the one or more vehicles towards the next parking slot.

7. The method as claimed in claim 1, wherein the 3D acceleration data of each of one or more vehicles is associated with movement of each of the vehicles in the parking environment and vibration of each of the one or more vehicles when each of the one or more vehicles passes through the one or more bumps.

8. A vehicle localization server for optimally localizing vehicles in a parking environment, the vehicle localization server comprising:

a processor; and a memory communicatively coupled to the processor, wherein the memory stores processor-executable instructions, which, on execution, causes the processor to:
- receive 3D acceleration data of each of one or more vehicles when each of the one or more vehicles passes through one or more bumps in the parking environment;
- compare the 3D acceleration data with one or more predefined 3D acceleration data, wherein each of the one or more predefined 3D acceleration data is associated with location status of each of the one or more bumps;
- obtain the location status of each of the one or more vehicles corresponding to the matched predefined 3D acceleration data; and
- localize each of the one or more vehicles in the parking environment based on the location status of each of the one or more vehicles.

9. The vehicle localization server as claimed in claim 8, wherein the instructions configure the at least one processor to receive the 3D acceleration data from a mobile device associated with each of the one or more vehicles.

10. The vehicle localization server as claimed in claim 8, wherein the instructions configure the at least one processor to identify type of each of the one or more vehicles based on the 3D acceleration data of each of the one or more vehicles.

11. The vehicle localization server as claimed in claim 10, wherein the instructions configure the at least one processor to:
- detect a suitable parking slot in the parking environment for each of the one or more vehicles based on the location status and the type of each of the one or more vehicles; and
- provide directions to each of the one or more vehicles towards the detected parking slot.

12. The vehicle localization server as claimed in claim 11, wherein the instructions configure the at least one processor to:
- detect a next parking slot in the parking environment for the one or more vehicles if the one or more vehicles are not parked in the detected parking slot; and provide directions to the one or more vehicles towards the next parking slot.

13. A non-transitory computer readable medium including instructions stored thereon that when processed by at least one processor cause a vehicle localization server to perform operations comprising:
- receiving acceleration data of each of one or more vehicles when each of the one or more vehicles passes through one or more bumps in the parking environment;
- comparing the 3D acceleration data with one or more predefined 3D acceleration data, wherein each of the one or more predefined 3D acceleration data is associated with location status of each of the one or more bumps;
- obtaining the location status of each of the one or more vehicles corresponding to the matched predefined 3D acceleration data; and
- localizing each of the one or more vehicles in the parking environment based on the location status of each of the one or more vehicles.

14. The medium as claimed in claim 13, wherein the instructions further cause the at least processor to receive the 3D acceleration data received from a mobile device associated with each of the one or more vehicles.

15. The medium as claimed in claim 13, wherein the instructions further cause the at least processor to identify type of each of the one or more vehicles based on the 3D acceleration data of each of the one or more vehicles.

16. The medium as claimed in claim 15, wherein the instructions further cause the at least processor to:
- detect a suitable parking slot in the parking environment for each of the one or more vehicles based on the location status and the type of each of the one or more vehicles; and
- provide directions to each of the one or more vehicles towards the detected parking slot.

17. The medium as claimed in claim 16, wherein the instructions further cause the at least processor to:
- detect a next parking slot in the parking environment for the one or more vehicles if the one or more vehicles are not parked in the detected parking slot; and
- provide directions to the one or more vehicles towards the next parking slot.

* * * * *